United States Patent [19]

Hartman

[11] 4,245,280
[45] Jan. 13, 1981

[54] MULTILAMP PHOTOFLASH UNIT CONSTRUCTION

[75] Inventor: Donald W. Hartman, Williamsport, Pa.

[73] Assignee: GTE Products Corporation, Stamford, Conn.

[21] Appl. No.: 72,529

[22] Filed: Sep. 4, 1979

[51] Int. Cl.³ .......................... F21K 5/02; G03B 15/02
[52] U.S. Cl. ...................................... 362/13; 362/237; 362/238; 362/240; 362/241; 362/247; 431/358; 431/359; 431/365
[58] Field of Search ................. 362/13, 237, 238, 240, 362/241, 247, 346; 431/358, 359, 365

[56] References Cited

U.S. PATENT DOCUMENTS

| 4,096,549 | 6/1978 | Anderson et al. | 431/359 |
| 4,101,259 | 7/1978 | Shaffer et al. | 431/359 |
| 4,101,260 | 7/1978 | Wanninkhof et al. | 431/359 |

Primary Examiner—Benjamin R. Padgett
Assistant Examiner—Irwin Gluck
Attorney, Agent, or Firm—Edward J. Coleman

[57] ABSTRACT

A photoflash unit comprising a linear array of flashlamps mounted on a printed circuit strip disposed within the longitudinal channel of an elongated housing member. A light-transmitting cover panel is attached to the housing member for enclosing the flashlamps. To provide structural rigidity, the cover has rectangular corner posts at each end and a transverse web at the center which engage slots in the housing and are secured by ultrasonic welding. The longitudinal edges are secured by a plurality of cylindrical posts along each side of the cover which fit into matching holes in the housing and have rivet heads formed on the ends as provided by ultrasonic heating and pressure.

15 Claims, 6 Drawing Figures

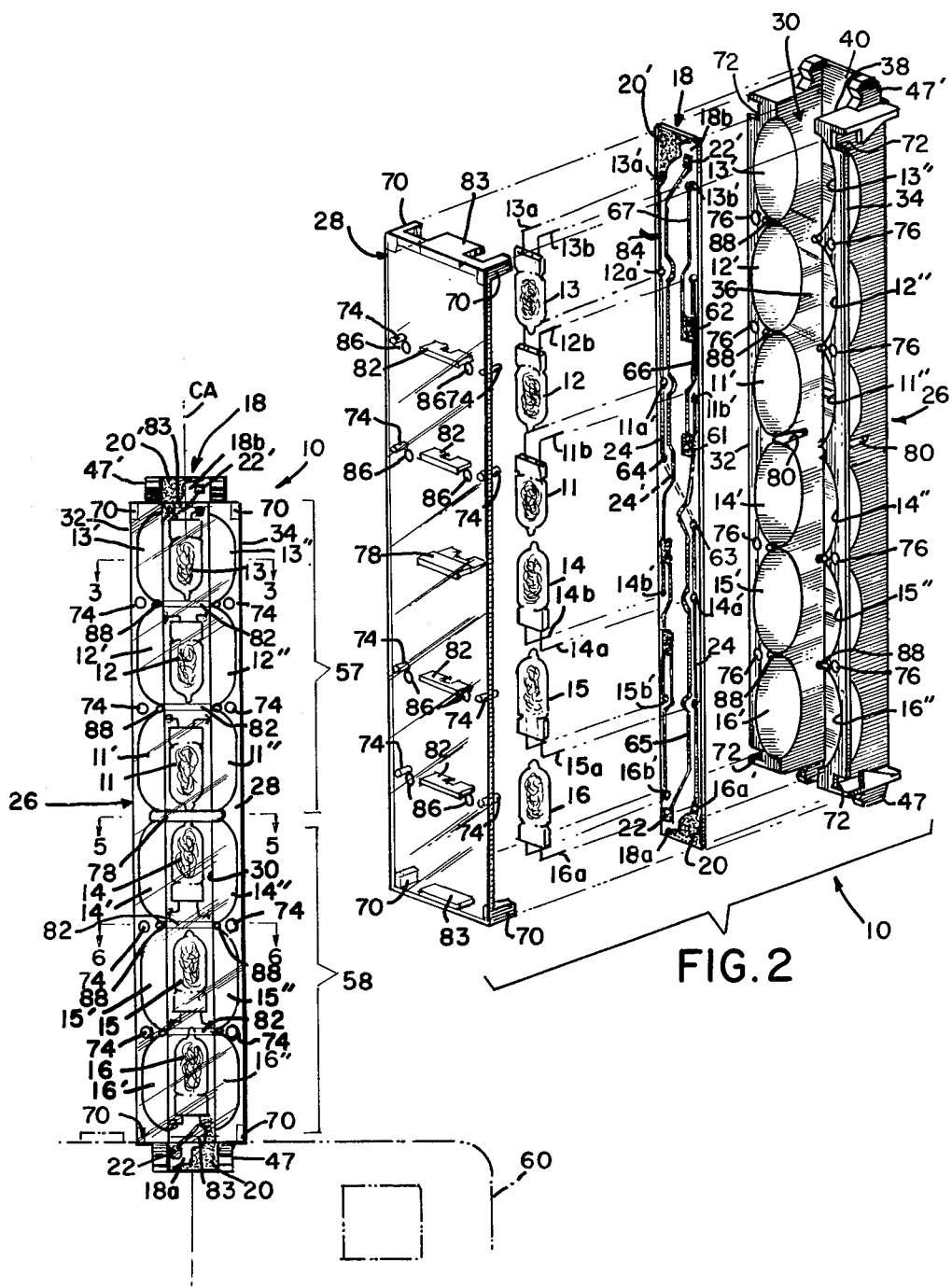

MULTILAMP PHOTOFLASH UNIT CONSTRUCTION

BACKGROUND OF THE INVENTION

This invention relates to multilamp photoflash units and, more particularly, to an improved construction therefor.

Previous multilamp photoflash units having a horizontally disposed base are represented by the eletrically fired fourlamp array referred to as a flash cube, such as described in U.S. Pat. No. 3,327,105, the percussively ignited four-lamp array referred to as a magicube, such as described in U.S. Pat. No. 3,730,669, and the electrically sequenced ten lamp array referred to as a flashbar, such as described in U.S. Pat. No. 3,857,667. In each of these arrays, the lamps are supported from a generally horizontal plastic base member with the tubular lamp envelopes oriented vertically. Enclosure of the package construction is provided by a transparent plastic cover member having four vertical sidewalls and a horizontal top wall. A multicavity reflector assembly is disposed about the lamps, and then the transparent cover member is placed over the array of lamps and reflectors and attached to the base member so as to provide an enclosed unit. Attachment of the plastic cover to the plastic base member is accomplished by ultrasonically welding the periphery of the cover member about a lip formed along the outer edges of the base member.

Another type of currently marketed photoflash unit, referred to as a flipflash, comprises a vertically planar array of eight or ten lamps which are ignited by sequentially applied high-voltage firing pulses. The overall construction of the flipflash unit comprises a substantially planar rear housing member and a front housing member in a form of a rectangular concavity, both housing members being formed of a plastic material. Sandwiched between the front and rear housing members, in the order named, are the flashlamps, a multicavity reflector assembly, a printed circuit board, and an indicia sheet. According to one embodiment, such as described in U.S. Pat. No. 4,047,015, the front and rear housing members are attached together by inerlocking latch means molded in the edges thereof. Use of integrity, as twisting the array or dropping the array several feet onto a hard surface was found to be sufficient to break it open. Accordingly, the seam about the adjoining peripheries of the front and rear housing members is also ultrasonically welded together. In another embodiment of the flipflash array, for example as described in U.S. Pat. No. 4,133,023, the front and rear housing members are joined solely by the welded seam about their peripheries.

According to another embodiment of a planar array of eight flashlamps, for example, as illustrated in German Offenlegungsschrift No. 2629041, published Jan. 27, 1977, the unit has a bathtub-shaped rear housing member, and a substantially planar transparent cover member. The planar cover is attached to the rear housing means by two posts projecting from the central portion of the cover in the upper and lower halves thereof, normal to the plane of the cover, which fit into and pass through respective openings in a pair of inwardly protruding bosses in the rear housing member. The ends of the posts projecting through the back of the rear housing are then reshaped with heat to form retaining lugs, or rivet heads. The perimeter of the rear housing and planar cover is unsealed except for small mechanical latches at each end provided by the fit of small cover projections into recesses in the rear housing. These latches are easily opened by twisting or dropping the array.

A copending patent application Ser. No. 072,257, filed concurrently herewith and assigned to the present assignee, describes a more compact, cost-efficient photoflash unit construction which comprises a plurality of electrically ignitable flashlamps disposed in a linear array along a strip-like printed circuit board. The assembly comprising the lamps mounted on the printed circuit strip is located within the longitudinal channel of an elongated housing member having outer flanges with reflective surfaces adjacent to the lamps. A light-transmitting cover panel is mounted to the housing member so as to enclose the flashlamps in the channel. In assembling the front cover to the rear housing member, which are both plastic, the peripheral surfaces of the cover panel facing the housing member are juxtaposed with a metalized reflective coating on the surfaces of the outer flanges of the housing member facing the panel. As a result, direct attachment of the cover panel to the integral rear housing-reflector member by ultrasonic welding about the joining peripheries of the two members is not consistent with the objective of a low-cost, compact, materials-efficient array. This is due to the metalized coating on the reflective outer surfaces of the housing member which prevents reliable welding. In order to utilize selective masking of the reflective areas of the housing for providing a welding surface or ledge, additional plastic materials, both cover and rear housing, would be necessary to increase the width of the product.

SUMMARY OF THE INVENTION

Accordingly, it is an object of the present invention to provide an improved multilamp photoflash unit having a simplified, more cost-efficient construction which is significantly more compact.

A principal object is to provide a cover attachment means for a multilamp photoflash unit having improved sructural rigidity and cost-efficiency.

These and other objects, advantages and features are attained in a multilamp photoflash unit comprising an elongated housing member having a longitudinal channel therein, and a plurality of flashlamps mounted in the channel, by providing an improved means of attaching a substantially rectangular light-transmitting cover panel to the housing member so as to enclose the flashlamps therein. Four end slots are provided in the housing member, with each pair of these end slots being located at respective ends of the housing on opposite sides of the channel. Respective corner posts projecting from the four corners of the cover panel, and disposed normal to the plane thereof, are fitted into respective end slots and secured thereto. A pair of center slots is provided at the midportion of the housing member in opposite sidewalls of the channel, and a transverse web projects from the center of the cover panel and fits into the center slots and is secured thereto. In this manner, each pair of corner posts straddles respective ends of the housing member and grips the outer sides thereof, and the transverse web bridges the channel at the midportion to provide oppositely directed forces with respect to the corner post.

The longitudinal edges of the cover are secured to the housing member by means including a plurality of openings located at spaced intervals along each of the two longitudinal sides of the housing member, and a plurality of side posts projecting from the cover panel and fitting into the side openings. The side posts project normal to the plane of the cover panel at spaced intervals along the two longitudinal sides thereof. Rivet heads are formed on the ends of the side posts to secure the assembly. Increased sructural rigidity can be provided by a plurality of additional transverse webs projecting from the cover panel at spaced intervals therealong, each aligned with a respective pair of the side posts on opposite sides of the housing channel. These additional transverse webs are arranged to bridge the channel in nonengageable proximity to the opposite sidewalls thereof.

In a preferred embodiment, the corner posts of the cover are rectangular and tab-shaped. The cross section of the housing member is substantially semi-rectangular, and the housing further includes outer flanges adjoining the opposite sidewalls of the channel, the end slots comprising notches formed in these outer flanges. The housing member is formed of a single molded piece of plastic insulating material, and a plurality of reflector cavity segments are formed in the outer flanges of this molded housing, each pair of the reflector cavity segments on opposite sides of the channel being associated with a respective one of the flashlamps. A continuous coating of reflective material covers the surfaces of the outer flanges facing the cover panel including the reflector cavity segments. The cover panel, including the posts and transverse webs, comprises a single molded piece formed of plastic insulating material, and the side posts projecting from the cover are cylindrical and fit into a respective plurality of holes in the outer flanges of the housing located at spaced intervals therealong on opposite sides of the channel. Preferably, the corner posts and central transverse web are secured to their respective slots in the housing by ultrasonic welding, and the rivet heads on the ends of the cylindrical side posts are provided by ultrasonic heating and pressure forming.

The cover attachment means of the invention has proved to be well adapted for providing a reliable, compact product by means of high speed production assembly processes. The resulting photoflash unit is resistant to spreading open, even under the force of ultrasonic welding, due to the location of the projecting cover and side posts. Inward collapse of the housing channel, with the resultant displacement of the reflector cavity flanges, is prevented by the transverse webs, which project from the cover panel in a manner bridging the channel. This assures proper reflector placement relative to the lamp, a factor necessary for maximum light gathering efficiency.

BRIEF DESCRIPTION OF THE DRAWINGS

This invention will be more fully described hereinafter in conjunction with the accompanying drawings in which:

FIG. 1 is a front elevation of a multilamp photoflash unit in accordance with the invention, with the camera on which it is mounted shown in phantom;

FIG. 2 is an exploded perspective view of the photoflash unit of FIG. 1;

DESCRIPTION OF PREFERRED EMBODIMENT

Figure 3:
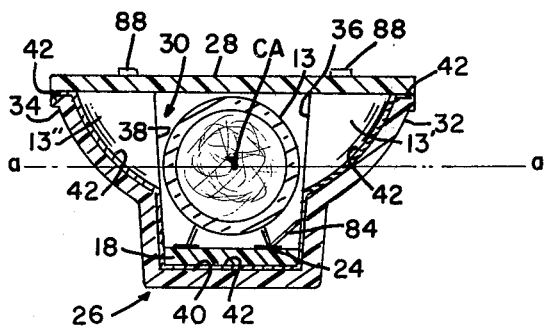
FIG. 3 is an enlarged cross-sectional view taken along 3—3 of FIG. 1.

FIGS. 1 and 2 illustrate a multilamp photoflash unit 10 similar to that described in the aforementioned copending application Ser. No. 072,251. It comprises a linear array of six flash lamps 11-13 and 14-16 mounted on a printed circuit board 18 in the form of an elongated strip. Each of the lamps has a pair of lead-in wires 11a, 11b, etc. connected to the printed circuitry on strip 18. For example, the lead-in wires 11a, 11b, etc., may be soldered to respective connector pads 11a′, 11b′, etc., forming portions of the conductive circuit runs on strip 18. Each of the lamps 11, etc. has a tubular light-transmitting glass envelope having a press-seal base at one end through which the lead-in wires emerge, and an exhaust tip at the other end. The envelope is filled with a quantity of filamentary combustible material, such as shredded zirconium, and a combustion supporting gas, such as oxygen. The ignition means within the lamp envelope may comprise, in the case of a low voltage source, a filament connected across the inner ends of the lead-in wires with beads of primer material disposed about the junctions of the lead-in wires and filament. In the case of a high voltage power source, for which the illustrated embodiment is particularly intended, the ignition structure may comprise a primer bridge or a spark gap type construction. For example, a particularly suitable high-voltage type flashlamp suitable for use in the linear array according to the present invention is described in U.S. Pat. No. 4,059,389, wherein the ignition structure comprises a pair of spaced apart lead-in wires with spherically shaped terminations, a glass frit coating over the lead-in wires and a coating of primer material over the frit-coated terminations. The primer may bridge the wire terminations, with the filamentary combustible being in contact with both terminations to provide a conducting path therebetween.

When the flashlamps are mounted and positioned on circuit strip 18, the lead-in wires 11a, 11b, etc., are bent at a right angle, as illustrated, so that all of the tubular envelopes of the lamps are positioned with the longitudinal axes thereof substantially parallel to the surface of printed circuit strip 18 and arranged in a substantially coaxial alignment along a common longitudinal axis CA. Further, as described in copending application Ser. No. 072,526, filed concurrently herewith and assigned to the present assignee, the three lamps 11-13 at the top half of the array are inverted with respect to the three lamps 14-16 at the bottom half of the array.

Referring to FIG. 2, the circuit strip 18 has a "printed circuit" thereon for causing sequential flashing of the lamps by applied firing voltage pulses. In this particular embodiment, essentially the entire printed circuit is provided on one surface of the strip 18, namely, the obverse side of the strip over which the flashlamps are positioned. The substrate of strip 18 comprises an insulating material, such as polystyrene, and the pattern of conductor runs may be provided on the surface thereof by means such as silk screening, chemical etching, etc. Each end of the circuit strip 18 functions as a connector tab, denoted as 18a and 18b respectively. The tab 18a is provided with a pair of electrical terminals 20 and 22, and similarly, the tab 18b is provided with a pair of terminals 20' and 22' for contacting terminals of a camera socket for applying firing voltage pulses to the array. As will be described in more detail hereinafter, the terminals 20 and 21' form part of and are connected to a common circuit conductor run 24 which is connected electrically to one lead-in wire of each of the flashlamps. As a result, terminals 20 and 20' function as part of a "ground" circuit and are shown as having an enlarged configuration for reducing the likelihood of lamps being accidentally flashed by electrostatic voltage when the array is handled.

The circuit strip-lamp assembly, which forms the functional core of the unit 10, is enclosed in a comparatively simple and compact housing construction of a cost-efficient and versatile design. More specifically, the unit enclosure comprises just two components, namely, a rear housing member 26 and a light-transmitting cover panel 28. Referring also to FIG. 3, housing member 26 has an elongated configuration and includes a longitudinal channel 30 which has a cross-section which is substantially semi-rectangular. The circuit strip-lamp assembly is located within channel 30, and cover panel 28 is attached to the front of the housing 26 so as to enclose the lamps. As illustrated in FIG. 1, the ends or tabs, 18a and 18b of the circuit strip extend beyond the opposite ends of the elongated cover panel 28 to expose the terminals 20, 22 and 20', 22', thereon for connection to a camera.

The rear housing member 26 further includes outer flanges 32 and 34 which adjoin the opposite sidewalls 36 and 38, respectively, of the semi-rectangular channel. Formed in these outer flanges are a plurality of symmetrical segments of parabolic reflector cavities, with each pair of reflector cavity segments 11', 11", etc. on opposite sides of the channel 30 being associated with a respective one of the flashlamps 11, etc. Housing member 26 is molded of an insulating plastic material, such as polystyrene but reflective surfaces are provided adjacent to all the flashlamps by covering all of the surfaces of channel 30 (i.e., sidewalls 36 and 38 and rear wall 40) and the surfaces of the outer flanges 32 and 34 which face the cover panel, including the parabolic reflector cavity segments 11', 11", etc., with a continuous coating of conductive reflective material 42. For example, the channel and front surfaces of the flanges may be metalized, such as by an aluminum vacuum deposition process. In this manner, member 26 integrally functions as a compact, cost-efficient, multi-cavity reflector member in addition to functioning as a rear housing enclosure. It will be noted that the lamp-carrying terminal strip is located substantially internal to this reflector member. Further, referring particularly to FIGS. 1 and 3, it will also be noted that the common longitudinal axis CA of the linear array of flashlamps 11, etc., is substantially parallel to the longitudinal axes of printed circuit strip 18 and channel 30 and lies in a plane a—a which symmetrically intersects the parabolic reflector cavity segments 11', 11", etc. on opposite sides of the channel. Hence, portions of the reflector cavities and sidewall reflective surfaces are located behind the longitudinal center line of the lamps so that as each lamp is flashed, light is projected forwardly of the array.

The housing member further includes integral extensions 47 and 47' at the opposite ends thereof which partly surround and protect the extending connector tabs 18a and 18b of the printed circuit strip 18, exposing the terminals thereon, and also function to facilitate mechanical attachment to the camera socket. The printed circuit strip 18 may be secured in channel 30 by means such as providing an interference fit with walls 36 and 38 or by applying a cement between the back of the strip 18 and the rear channel wall 40 (FIG. 3).

The light-transmitting cover panel 28 basically comprises a planar strip of clear plastic material, such as polystyrene, and is attached to the plastic rear housing member 26 by means according to the present invention, as will be described in detail hereinafter.

When fully assembled, the completed photoflash unit according to the invention is provided with a plug-in connector tab 18a at the lower end thereof which is adapted to fit into a camera or flash adapter. A second plug-in connector tab 18b is provided at the top end of the unit whereby the array is adapted to be attached to the camera socket in either of two orientations, i.e. with either the tab 18a or 18b plugged into the socket. The lamps are arranged in two groups of three disposed on the upper and lower halves, respectively, of the elongated linear array. Upper group 57 comprises lamps 11–13, and lower group 58 includes lamps 14–16; the reflector cavity segments 11', 11", etc., along with the reflective channel sidewalls, are associated with the respective lamps so that as each lamp is flashed, light is projected forwardly of the array. The lamps are arranged and connected so that when the array is connected to a camera by the connector tab 18a (such as illustrated in FIG. 1 for the case of camera 60 shown in phantom) only the upper group 57 of the lamps will be flashed, and when the array is turned end for end and connected to the camera by the other connector tab 18b, only the then upper group 58 of lamps will be flashed. By this arrangement, only lamps relatively far from the camera lens axis are flashable, thus reducing the undesirable red-eye effect.

Referring to FIG. 2, the circuit board 18 has a "printed circuit" thereon for causing sequential flashing of the lamps by firing voltage pulses applied to the terminals 20, 22, 20', 22'. The top and bottom of the printed circuitry preferably are reverse mirror images of each other. The circuit located on the upper half of the circuit strip 18 and activated by the pair of terminals 20 and 22 includes three lamps 11–13 arranged in parallel across the input terminals. The circuit also includes two normally open (N/O) radiant-energy-activated connect switches 61 and 62 for providing sequential flashing of lamps 11–13 in response to firing pulses successively applied to the input terminals 20 and 22. Each N/O connect switch is responsive to the flashing of an associated lamp to form a closed circuit condition. One terminal (lead-in wire) of each of the lamps 11–13 is connected in common by means of an electrical "ground" circuit run 24 to input terminal 20. The "ground" circuit run 24 includes the terminals 20 and 20' and makes contact with one of the lead-in wires for each of the lamps 11–16. This "ground" circuit crossover is accomplished at the midportion of the circuit strip, without interfering with the "hot", or signal, conductor runs by terminating the common conductor runs 24 on each half of the strip at through-connection points 63 and 64, such as eyelets passing through the strip 18, and interconnecting these points on the reverse side of the strip by a common conductor segment, indicated as 24'.

The first lamp to be fired, namely, lamp 11, is connected directly across the input terminals 20 and 22.

The N/O connect switches 61 and 62 are series connected in that order with lamp 13, which is the third and last lamp to be fired, across the input terminals 20 and 22. The second lamp to be fired (lamp 12) is series connected with the N/O switch 61.

Terminal 22 is part of a "hot" or signal circuit conductor run 65 that terminates at a lead-in wire of lamp 11 and one terminal of the N/O switch 61. The other side of switch 61 is connected to a lead-in wire of lamp 12 and to one terminal of N/O switch 62 via circuit run 66. Circuit run 67 then connects the other terminal or switch 62 to a lead-in wire of lamp 13.

The radiant-energy-activated N/O connect switches 61 and 62 are in contact with and bridge across the circuit runs that are connected to them. The material for the connect switch is selected to be of the type initially having an open circuit or high resistance, the resistance thereof becoming literally zero or a lower value when the material receives radiation in the form of heat and/or light from a respective adjacent lamp, upon the lamp being flashed. For this purpose, each of the connect switches is respectively positioned behind and near to an associated flashlamp. More specifically, switch 61 is positioned behind lamp 11, and switch 62 is positioned behind lamp 12.

The high resistance paste used to make switches 61 and 62 may comprise a known mixture of silver compound and a binder. According to a preferred embodiment, however, the material comprises a silver compound such as silver carbonate, a binder such as polystyrene resin, a large proportion of electrically non-conductive inert particulate solids, such as titanium dioxide, and a protective oxidizing agent such as barium chromate. For example, as described in a copending application Ser. No. 021,398, filed Mar. 19, 1979, and assigned to the present assignee, the dried composition of a specific silk screenable high resistance material comprises 67.43% silver carbonate, 22.48% titanium dioxide, 8.99% glass beads, 0.11% barium chromate, 0.07% lecithin as a wetting agent, and 0.91% polystyrene resin as a binder. The barium chromate was included to enhance environmental stability, as described in U.S. Pat. No. 4,087,233. This mixture is made into a paste by ball milling in a suitable solvent such as butyl cellosolve acetate. The solids content may be adjusted to suit the method of switch application. For silk screening over a circuit strip, it is preferred to adjust the solids content to about 74%.

The circuit on the circuit strip 18 functions as follows. Assuming that none of the three lamps on the upper half of the unit have been flashed, upon occurrence of the first firing pulse applied across the terminals 20 and 22, this pulse will be directly applied to the lead-in wires of the first-connected flashlamp 11, whereupon lamp 11 flashes and becomes an open circuit between its lead-in wires. Heat and/or light radiation from the flashing first lamp 11 is operative to activate the N/O connect switch 61. As a result, the radiation causes the normally open connect switch 61 to become a closed circuit (or a low value of resistance), thereby connecting the circuit strip terminal 22 electrically to the second lamp 12 via circuit run 66. By the time this occurs, the firing pulse has diminished to a value insufficient to cause the second lamp 12 to flash. When the next firing pulse occurs, it is applied to the lead-in wires of the second lamp 12 via the now closed connect switch 61, whereupon the second lamp 12 flashes and becomes an open circuit between its lead-in wires, with the lamp radiation causing the connect switch 62 to assume a near zero or low resistance. When the next firing pulse occurs, it is applied via the now closed connect switches 61 and 62 to the lead-in wires of the third flashlamp 13, thereupon causing the lamp to flash. Since this lamp is the last lamp in the active circuit, it does not matter whether its lead-in wires are an open or closed circuit after flashing. When the flash unit is turned around and the other connector tab 18b attached to the camera socket, the group 58 of lamps that then becomes upper most and farthest away from the camera lens will be in the active circuit and will be flashed in the same manner as has been described. In a preferred embodiment, the lamps 11, etc., are high voltage types requiring about 2,000 volts, for example, at low current for flashing, and they can be fired by impacting or stressing a piezoelectric element in the camera.

The high degree of electrical sensitivity needed in high-voltage flashlamps gives rise to distinct problems of inadvertent flashing during handling of the array package. Any static charges on equipment and personnel can cause the lamp to flash. Accordingly, as described in the aforementioned copending application Ser. No. 072,251, electrostatic protection is provided by the rear housing member 26 in a cost-efficient manner by electrically connecting the conductive coating 42 to the common circuit conductor 24 by means such as a wire 84 soldered therebetween (FIGS. 2 and 3). In this manner, continuous conductive surfaces on rear wall 40 and sidewalls 36 and 38 of channel 30, and on the reflector cavities and front faces of outer flanges 32 and 34, provide a protective electrostatic shield about three sides of the sensitive circuit strip 18 and the lamps 11–16 mounted thereon.

Protection against electrostatic charges about the front face of the unit is provided in a manner following the teaching of U.S. Pat. No. 4,113,424. Cover panel 28 is provided with eight openings 86 distributed throughout the length thereof, as illustrated, and housing member 26 further includes eight metal-coated posts, or projections, 88 which respectively fit into the front face openings 86. Preferably, the conductive reflector projections protrude through the openings 86 in the cover panel beyond the exterior surface thereof, as shown in FIG. 3, so as to assure electrical contact with any charged object such as a user's band, which may touch the array housing.

As illustrated in FIGS. 1 and 2, projections 88 are symmetrically disposed on the front face of the housing flanges 32 and 34 between reflector cavity segments 11', 11" and 12', 12"; 12', 12" and 13', 13"; 14', 14" and 15', 15"; and 15', 15" and 16', 16". These projections 88 are integral molded portions of the insulating plastic material of housing 26 which are covered with the continuous conductive reflective coating 42. Accordingly, the conductive projection 88 are connected to the common circuit conductor 24 via the surface coating 42 and wire 84.

Figure 4:
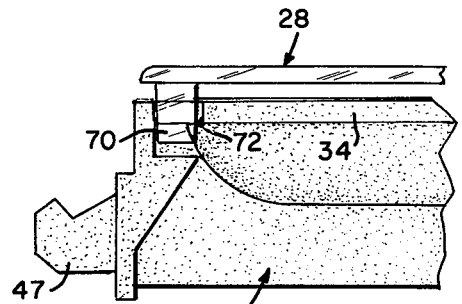
FIG. 4 is a fragmentary side view of an end portion of the unit of FIGS. 1 and 2, but with the cover panel spaced apart from the housing to illustrate assembly alignment of a corner post.

In accordance with the present invention, cover panel 28 is attached to the housing member 26 in the following manner in order to provide improved structural rigidity while retaining the objectives of compactness and cost-efficiency. As illustrated in FIGS. 2 and 4, the cover panel 28 molding includes four rectangular, tab-shaped corner posts 70 which fit into respective end slots 72 in the housing member and straddle respective ends thereof. More specifically, each of the tab-shaped posts 70 projects from one of the four corners of the cover panel 28 at an angle normal to the plane thereof, and each of the end slots 72 comprises a notch formed in one of the outer flanges 32 or 34. Each pair of end slots notches 72 are located at respective ends of the housing member 26 on opposite sides of the channel 30. FIG. 4 shows the alignment of a corner post 70 and notch 72 just prior to complete assembly of a cover panel 28 to housing 26. When completely assembled, therefore, each pair of corner posts 70 straddles respective ends of the housing member 26 and grips the outer sides thereof. The peripheries of each post 70 and notch 72 are then secured by ultrasonic welding. This secures the ends of the panel 28 and prevents spreading of the respective ends of the housing 26.

Figure 5:
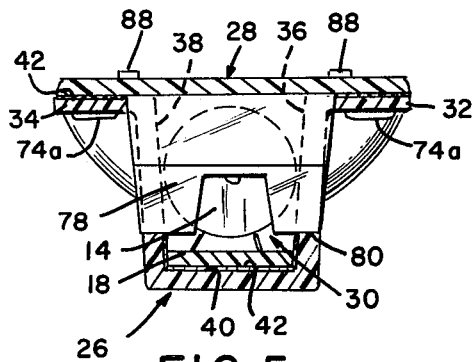
FIG. 5 is an enlarged cross-sectional view taken along 5—5 of FIG. 1 to show the central web.

Referring also to FIG. 5, the cover panel 28 molding further includes a transverse web 78 which projects from the center of the cover panel normal to the plane thereof and fits within center slots 80 on the sidewalls 36 and 38 of the housing channel 30. Ultrasonic welding is also employed to secure each side of the web 78 which engages a slot 80. As illustrated, web 78 thereby bridges the housing channel 30 to provide oppositely directed forces with respect to the four corner posts 70 so as to prevent collapse of the central portion of the cover panel and channel and assure a snug fit.

Figure 6:
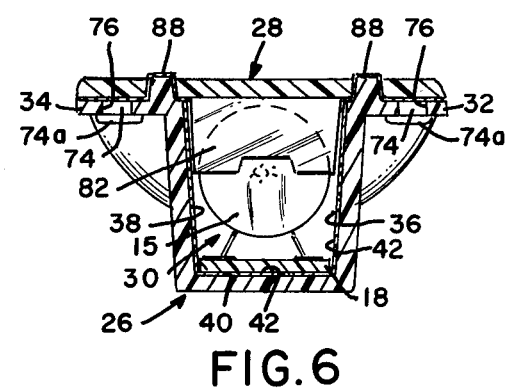
FIG. 6 is an enlarged cross-sectional view taken along 6—6 of FIG. 1 to show one of the additional webs and a pair of secured side posts.

Referring also to FIG. 6, the cover panel 28 molding also includes a plurality of cylindrical side posts 74 projecting from the cover panel normal to the plane thereof at spaced intervals along two longitudinal sides thereof. More specifically, in the six lamp unit illustrated, there are a total of eight side posts 74, with four posts symmetrically disposed on each side of the panel. The cylindrical side posts 74 respectively fit into a plurality of openings, or holes, 76 located at spaced intervals along each of two longitudinal sides of the housing member 26. More specifically, four pairs of the holes are symmetrically disposed on opposite sides of the channel 30 in the housing member flanges 32 and 34 between reflector cavity segments 11', 11'' and 12', 12''; 12', 12'' and 13', 13''; 14', 14'' and 15', 15''; and 15', 15'' and 16', 16''. Ultrasonically heated and pressure formed rivet heads 74a (FIG. 6) are formed on the ends of these posts to secure the longitudinal edges of the cover to the housing.

Further yet, the cover panel 28 molding includes a plurality of additional transverse webs 82 and 83 projecting from the cover panel normal to the plane thereof and at spaced intervals therealong. Two of the additional transverse webs, denoted as 83, are disposed at opposite ends of the cover panel 28; i.e. at the ends of the panel beyond which the end tabs 18a and 18b of the printed circuit strip extend. Four of the additional transverse webs, denoted as 82, are each aligned with a respective pair of the side posts 74 on opposite sides of the channel 30. All of the additional transverse webs 82 and 83 bridge channel 30 in nonengageable proximity to the opposite sidewalls 36 and 38 thereof (FIG. 6) to enhance sructural rigidity by preventing inward collapse of the channel 30. The end result of the aforementioned cover attachment features is a rigid product which is resistant to spreading open, under, say, the 80–100 pounds force of ultrasonic welding, due to the external location of the posts 70 and 74. Inward collapse of the U-channel reflector-housing member is prevented by the internal webs, thereby preventing resultant displacement of the reflector cavity segments 11', 11'', etc., and insuring proper reflector placement relative to the lamps, which is necessary for maximum light gathering efficiency.

As described in copending application Ser. No. 072,534, filed concurrently herewith and assigned to the present assignee, the webs 78 and 82, if disposed between adjacent lamps, made sufficiently large and rendered light-attenuating, may also be used to provide partitions between the lamps of the array for preventing sympathetic flashing.

Although the invention has been described with respect to a specific embodiment, it will be appreciated that modifications and changes may be made by those skilled in the art without departing from the true spirit and scope of the invention. For example, the construction is not limited to linear high-voltage arrays but is also adaptable to elongated planar arrays, and the like, containing lamps ignitable by high-voltage or low-voltage sources, or by percussive activation. The array may be single ended, with a connector on only one end; the lamps may all be oriented in one direction; and the number of lamps may vary. For example, a higher output lamp array of the double ended type may comprise two lamps of much larger volume positioned in each of the upper and lower groups and housed in a package of slightly larger dimensions. Further, the number and longitudinal disposition of the webs 82 and side posts 74 may differ from that illustrated.

I claim:

1. In a multilamp photoflash unit comprising an elongated housing member having a longitudinal channel therein, and a plurality of flashlamps mounted in said channel, a substantially rectangular light-transmitting cover panel enclosing said flashlamps in the channel and attached to said housing member by means comprising: four end slots in said housing member, each pair of said end slots being located at respective ends of said housing member on opposite sides of said channel, a corner post projecting from each of the four corners of said cover panel and disposed normal to the plane thereof, each of said corner posts fitting into a respective one of said end slots and being secured thereto, a pair of center slots at the midportion of said housing member in opposite sidewalls of said channel, and a transverse web projecting from the center of said cover panel and fitting into said center slots and being secured thereto, whereby each pair of said corner posts straddles respective ends of said housing member and grips the outer sides thereof, and said transverse web bridges said channel at the midportion thereof to provide oppositely directed forces with respect to said corner posts.

2. The photoflash unit of claim 1 wherein said corner posts are secured to said end slots in the housing member by being ultrasonically welded thereto.

3. The photoflash unit of claim 2 wherein said transverse web is secured to said center slots in the housing member channel by being ultrasonically welded thereto.

4. The photoflash unit of claim 1 wherein said cover attachment means further includes a plurality of openings located at spaced intervals along each of two longitudinal sides of said housing member, and a plurality of side posts projecting from said cover panel normal to the plane thereof at spaced intervals along the two longitudinal sides thereof and respectively fitting into said side openings, rivet heads being formed on the ends of said side posts to secure the longitudinal edges of said cover to said housing member.

5. The photoflash unit of claim 4 wherein said side posts are cylindrical and said side openings are holes in said housing member disposed on opposite sides of said channel.

6. The photoflash unit of claim 5 wherein said rivet heads are provided by ultrasonic heating and pressure forming.

7. The photoflash unit of claim 4 wherein said cover panel further includes a plurality of additional transverse webs projecting therefrom at spaced intervals therealong and each aligned with a respective pair of said side posts on opposite sides of said channel, said additional transverse webs bridging said channel in nonengageable proximity to the opposite sidewalls thereof for enhancing structural rigidity.

8. The photoflash unit of claim 1 wherein each of said corner posts are rectangular.

9. The photoflash unit of claim 8 wherein each of said corner posts is tab-shaped, and said end slots comprise notches in the sides of said housing member.

10. The photoflash unit of claim 9 wherein said channel in the housing member has a cross-section which is substantially semirectangular, said housing member further includes outer flanges adjoining the opposite sidewalls of said semi-rectangular channel, said end slot notches are formed in said outer flanges, each pair of reflector cavity segments on opposite sides of said channel are associated with a respective one of said flashlamps, and a continuous coating of reflective material covers the surfaces of said outer flanges facing said cover panel including said reflector cavity segments.

11. The photoflash unit of claim 10 wherein said cover attachment means further includes a plurality of holes in said outer flanges located at spaced inervals therealong on opposite sides of said channel, and a plurality of cylindrical side posts projecting from said cover panel normal to the plane thereof at spaced intervals along the two longitudinal sides thereof and respectively fitting into said holes, rivet heads being formed on the ends of said side posts to secure the longitudinal edges of said cover to said reflective coated outer flanges of said housing member.

12. The photoflash unit of claim 11 wherein said unit further includes a printed circuit board in the form of an elongated strip having lamp firing circuitry thereon, said plurality of flashlamps are disposed in a linear array along said printed circuit strip and have lead-in wires connected to said circuitry, an end of said printed circuit strip contains terminals connected to said lamp-firing circuitry, said printed circuit strip is located within said channel in the housing member, and said end of the circuit strip extends beyond said cover panel to expose said terminals thereon for connection to a camera.

13. The photoflash unit of claim 12 wherein said linear array of flashlamps is divided into first and second groups of two or more lamps each disposed in respectively opposite halves of said printed circuit strip, said printed circuit strip includes first and second connector means at respectively opposite ends thereof, said first connector means being located on the half of said circuit strip containing said first group of lamps and separated thereby from said second group of lamps, said second connector means being located on the half of said circuit strip containing said second group of lamps and separated thereby from said first group of lamps, a portion of said circuitry couples said first connector means to each lamp of said second group of lamps, another portion of said circuitry couples said second connector means to each lamp of said first group of lamps, said first and second connector means comprise respective sets of terminals on opposite ends of said printed circuit strip, said ends of the printed circuit strip extend beyond opposite ends of said cover panel to expose said terminals thereon for connection to a camera, said cover panel further includes a plurality of additional transverse webs projecting therefrom at spaced intervals therealong, two of said additional transverse webs being disposed at said opposite ends of the cover panel at which the ends of said printed circuit strip extend, and said additional transverse webs bridge said channel in nonengageable proximity to the opposite sidewalls thereof.

14. The photoflash unit of claim 13 wherein said tab-shaped corner posts are secured to said end notches in the outer flanges of said housing member by ultrasonic welding, said transverse web projecting from the center of said cover panel is secured to said center slots in the housing member channel by ultrasonic welding, and said rivet heads on the ends of said cylindrical side posts are provided by ultrasonic heating and pressure forming.

15. The photoflash unit of claim 1 wherein said housing member comprises a single molded piece formed of a plastic insulating material, said channel in the housing member has a cross-section which is substantially semirectangular, said housing member further includes outer flanges adjoining the opposite sidewalls of said semi-rectangular channel, said end slots comprise notches formed in said outer flanges, a plurality of segments of reflector cavities are formed in said outer flanges, each pair of reflector cavity segments on opposite sides of said channel are associated with a respective one of said flashlamps, and a continuous coating of reflective material covers the surfaces of said outer flanges facing said cover panel including said reflector cavity segments, and said cover panel including said corner posts and transverse web comprises a single molded piece formed of plastic insulating material.

* * * * *